J. B. MOORE.
THREAD PITCH GAGE.
APPLICATION FILED DEC. 9, 1916.
1,249,804.
Patented Dec. 11, 1917.
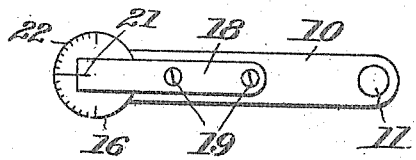
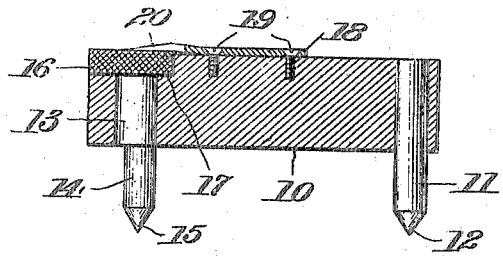
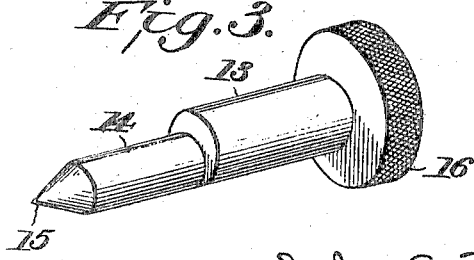

UNITED STATES PATENT OFFICE.

JOHN B. MOORE, OF LATROBE, PENNSYLVANIA.

THREAD-PITCH GAGE.

1,249,804.     Specification of Letters Patent.     Patented Dec. 11, 1917.

Application filed December 9, 1916. Serial No. 135,980.

*To all whom it may concern:*

Be it known that I, JOHN B. MOORE, a citizen of the United States, residing at Latrobe, in the county of Westmoreland and State of Pennsylvania, have invented new and useful Improvements in Thread-Pitch Gages, of which the following is a specification.

This invention is a device for determining inaccuracies in the pitch of screw threads.

In the cutting of screw threads, it is well known that even if there is the slightest inaccuracy in the pitch of the thread at the start of the cutting operation, such inaccuracy is multiplied or increased as the cutting proceeds, and while a certain amount of leaway is ordinarily allowed, there are conditions where the distortion becomes so great as to render the threaded part useless. These inaccuracies are ordinarily not discovered until an attempt is made to assemble complemental threaded elements, and are usually evidenced by the fact that said elements will not properly engage. The object of the present invention is to provide a simple device by means of which any inaccuracies or distortions in the pitch of a screw thread may be readily discovered, and the extent thereof quickly determined.

The invention will be hereinafter fully set forth and particularly pointed out in the claims.

In the accompanying drawing:—

Figure 1 is a top plan view of a device constructed in accordance with the invention. Fig. 2 is a longitudinal sectional view. Fig. 3 is an enlarged detail perspective view illustrating one of the gage members.

Referring to the drawing, 10 designates a body, provided at one end with a stationary gage member 11, which may be formed integral with said body, but is preferably formed of a pin driven through a suitably shaped opening in the body 10. The lower end of the gage member 11 is cone shaped as indicated at 12, the taper of the cone conforming to the angle of the thread. Rotatably mounted in the other end of the body 10 is a carrier 13, provided with an eccentrically disposed movable gage member 14, the lower end of which is tapered at 15 in a manner similar to the end 12, of the gage member 11. The upper end of the carrier 13 is provided with a milled head 16, by which it may be easily rotated, said head resting in a recess 17 formed in the body 10. The carrier 13 is removably retained in position by means of a spring plate 18, attached to the top of the body 10, by means of screws 19, said plate having a resilient end 20, pressing downwardly upon the milled head 16. Said resilient end is tapered down to a thin edge, and is provided with an indicator mark 21, which is positioned to coöperate with a scale 22 placed on the top of the head 16.

In practice the carrier 13 is adjusted so that the scale mark 21 coincides with the middle mark on the scale 22, and when so adjusted the gage members 11 and 14 are so positioned that their axes are intersected by the longitudinal median line of the top of the body, and are separated a predetermined distance. By placing the pointed ends 12 and 15 in engagement with a screw thread, if said ends fit in the angles between the threads without further adjustment, it is apparent that the threads are accurately cut. If they do not so engage, the operator rotates the head 16, thereby adjusting the gage member 14 with respect to the gage member 11, until the gage member 14 is so positioned that the ends 12 and 15 will fit in the angles between the threads. The distance between the two gage members may then be measured by a micrometer gage if desired, or if the scale 22 is used the extent of distortion is indicated thereby. It will be understood that the gage members 11 and 14 may be removed and others substituted therefor having a different angle to the cone ends 12 and 15, when the angle between the threads is different.

Having thus explained the nature of the invention, and described an operative manner of constructing and using the same, although without attempting to set forth all of the forms in which it may be made, or all of the forms of its use, the following is claimed:—

1. A screw thread pitch gage comprising a body provided with a stationary gage member having its end shaped to engage a screw thread, and a second gage member extended through and carried by said body and movable relatively to the first gage member in a circular path, said gage members extending from said body in the same direction and in parallel relation.

2. A screw thread pitch gage comprising a body provided with a stationary gage member, a second gage member, and a movable support extended through and carried by said body and capable of adjusting the second gage member relative to the other gage member in a circular path, the ends of said gage members being shaped to conform to the angle of the cut of the thread, said gage members extending from said body in the same direction and in parallel relation.

3. A screw thread pitch gage comprising a body provided with a stationary gage member, a carrier mounted in said body and provided with a gage member mounted eccentrically with respect to the axis thereof, said gage members having ends shaped to conform to the angle of the cut of the thread to be measured, said gage members being mounted in parallel relation.

4. A screw thread pitch gage comprising a body provided with a stationary gage member, a rotatable carrier mounted in said body, and a gage member supported by said carrier, and positioned eccentrically with respect to the axis of the carrier, the ends of said gage members being shaped to conform to the angle of the cut of the thread to be measured, said gage members being mounted in parallel relation.

5. A screw thread pitch gage comprising a body provided with a stationary gage member, a carrier mounted in said body and provided with a gage member mounted eccentrically with respect to the axis thereof, and a spring plate for maintaining said movable gage member in position, the ends of said gage members being shaped to conform to the angle of the cut to be measured.

6. A screw thread pitch gage comprising a body provided with a stationary gage member, a rotatable carrier mounted in said body, a gage member supported by said carrier, and positioned eccentrically with respect to the axis of the carrier, the ends of said gage members being shaped to conform to the angle of the cut of the thread to be measured, and a spring plate attached to said body and bearing against the end of said carrier.

7. A screw thread pitch gage comprising a body provided with a stationary gage member, a rotatable carrier mounted in said body and provided with a head and with a gage member, and positioned eccentrically with respect to the axis of the carrier, the ends of said gage members being shaped to conform to the angle of the cut of the thread to be measured, and a spring plate attached to said body and bearing upon said head, said plate and said body being provided with indicating means.

In testimony whereof I have hereunto set my hand.

JOHN B. MOORE.

Copies of this patent may be obtained for five cents each, by addressing the "Commissioner of Patents, Washington, D. C."